US011021167B2

(12) United States Patent
Yokota et al.

(10) Patent No.: US 11,021,167 B2
(45) Date of Patent: Jun. 1, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Tomonori Yokota, Wako (JP); Satomi Tomokuni, Wako (JP); Satoshi Tabuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/599,154

(22) Filed: Oct. 11, 2019

(65) Prior Publication Data

US 2020/0114927 A1 Apr. 16, 2020

(30) Foreign Application Priority Data

Oct. 15, 2018 (JP) .............................. JP2018-194310

(51) Int. Cl.
*B60W 50/00* (2006.01)
*G05B 13/02* (2006.01)
*G06F 8/65* (2018.01)

(52) U.S. Cl.
CPC ........... *B60W 50/00* (2013.01); *G05B 13/026* (2013.01); *G06F 8/65* (2013.01); *B60W 2050/0077* (2013.01); *B60W 2050/0083* (2013.01)

(58) Field of Classification Search
USPC ...................................................... 717/172
See application file for complete search history.

(56) References Cited

U.S. PATENT DOCUMENTS 9,092,288 B2 * 7/2015 Nagai ....................... G06F 8/61
9,156,356 B2 * 10/2015 Rini ........................ B60L 58/15
(Continued)

FOREIGN PATENT DOCUMENTS

JP 04-274972 9/1992
JP 2015-079468 4/2015
(Continued)

OTHER PUBLICATIONS

Mansour et al.; "AiroDiag: A Sophisticated Tool that Diagnoses and Updates Vehicles Software Over Air"; 2012 IEEE International Electric Vehicle Conference (pp. 1-7); 2012 (Year: 2012).*
(Continued)

*Primary Examiner* — Wei Y Zhen
*Assistant Examiner* — Clint Thatcher
(74) *Attorney, Agent, or Firm* — Amin, Turocy & Watson, LLP

(57) ABSTRACT

A vehicle control device includes a controller with embedded software which controls at least some of devices mounted in the vehicle, a communicator configured to communicate with an external device, an update controller which updates the software embedded in the controller according to communication with the external device by the communicator, a power supply configured to supply power to the controller, and a vehicle state predictor configured to predict a state of the vehicle, in which the update controller interrupts an update of the software when the vehicle state predictor predicts that a connection between the power supply and the controller is in a disconnected state during the update of the software.

8 Claims, 6 Drawing Sheets

(56) References Cited

U.S. PATENT DOCUMENTS

| | | | | |
|---|---|---|---|---|
| 2015/0007155 | A1* | 1/2015 | Hoffman | G06F 8/65 |
| | | | | 717/168 |
| 2015/0032315 | A1* | 1/2015 | Kinomura | B60L 3/0069 |
| | | | | 701/22 |
| 2019/0217777 | A1* | 7/2019 | Vangelov | B60R 16/0231 |
| 2019/0259223 | A1* | 8/2019 | Sangameswaran | H04L 67/34 |
| 2019/0294431 | A1* | 9/2019 | Saito | G06F 11/00 |
| 2020/0034134 | A1* | 1/2020 | Jayaraman | H04L 67/02 |
| 2020/0073653 | A1* | 3/2020 | Jeong | G01R 31/36 |
| 2020/0133812 | A1* | 4/2020 | Ogawa | G06F 1/28 |
| 2020/0174778 | A1* | 6/2020 | David | H04W 4/80 |

FOREIGN PATENT DOCUMENTS

| | | |
|---|---|---|
| JP | 2017-157004 | 9/2017 |
| JP | 62-16730 | 10/2017 |
| JP | 2017-199183 | 11/2017 |
| JP | 2018-037022 | 3/2018 |
| JP | 2019-196732 | 11/2019 |
| WO | 2012/017719 | 2/2012 |

OTHER PUBLICATIONS

Onuma et al.; "A Method of ECU Software Updating"; 2018 International Conference on Information Networking (ICOIN) (pp. 298-303); 2018 (Year: 2018).*

Japanese Office Action for Japanese Patent Application No. 2018-194310 dated Jan. 21, 2020.

* cited by examiner

| ECU IDENTIFICATION INFORMATION | LATEST UPDATE DATE | VERSION INFORMATION |
|---|---|---|
| A001 | * * * | V5.2 |
| B002 | * * * | V3.0 |
| C003 | * * * | V10.0 |
| ... | ... | ... |

| ECU IDENTIFICATION INFORMATION | INTERRUPTION DATE AND TIME | VERSION INFORMATION | MODULE INFORMATION | INTERRUPTION REASON |
|---|---|---|---|---|
| B002 | * * * | V3.1 | M003 | DOOR OPEN |
| ... | ... | ... | ... | ... |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-194310, filed Oct. 15, 2018, the content of which is incorporated herein by reference.

BACKGROUND

The present invention relates to a vehicle control device, a vehicle control method, and a storage medium.

FIELD OF THE INVENTION

Conventionally, an update device that updates software embedded in a controller that controls a device mounted in a vehicle is known (for example, Japanese Patent No. 6216730). Patent Document 1 discloses a technology which performs control such that communication with a server is performed by wireless communication, update data and identification information for identifying an application method for applying the update data to a controller are received from a server for each of a plurality of controllers, and the update data is applied to each of the plurality of controllers on the basis of the received identification information.

SUMMARY

However, in the conventional technology, if there is an unexpected power loss in a vehicle, since power is not supplied to a controller and an update of software is interrupted, there is a possibility of a problem occurring in a memory in the controller or in a program being updated.

Aspects of the present invention have been made in view of such circumstances, and an object thereof is to provide a vehicle control device, a vehicle control method, and a storage medium that can execute the update of software more appropriately.

The vehicle control device, the vehicle control method, and the storage medium according to the present invention have adopted the following configuration.

(1): A vehicle control device according to one aspect of the present invention includes a controller with embedded software which controls one or more devices mounted in a vehicle, a communicator configured to communicate with an external device, an update controller which updates the software embedded in the controller according to communication with the external device by the communicator, a power supply configured to supply power to the controller, and a vehicle state predictor configured to predict a state of the vehicle, in which the update controller interrupts an update of the software when the vehicle state predictor predicts that a connection between the power supply and the controller is to be disconnected during the update of the software.

(2): In the aspect of (1) described above, the software may contain one or more program modules, and the update controller may divide the software to be updated into a plurality of blocks containing one or more program modules, and interrupt the update based on the divided blocks when the update of the software is interrupted.

(3): In the aspect of (2) described above, the update controller may discard information on a block being downloaded from the external device when the update of the software is interrupted.

(4): In the aspect of (2) described above, the update controller may interrupt the update of the software after a download of the block being downloaded from the external device is completed when the update of the software is interrupted.

(5): In the aspect of (1) described above, the vehicle state predictor may predict that the connection between the power supply and the controller is to be disconnected when the vehicle state predictor detects that a lid portion opened, the lid portion partitioning a space in which the power supply or the controller is installed.

(6): In the aspect of (1) described above, the vehicle state predictor may predict that the connection between the power supply and the controller is to be disconnected when the vehicle state predictor detects that a lid portion opened, the lid portion partitioning a space in which a wiring connecting the power supply and the controller is present.

(7): In the aspect of (1) described above, an operator configured to receive an operation from an occupant of the vehicle is further included, and the vehicle state predictor may predict that the connection between the power supply and the controller is to be in a disconnected state when the operator receives a preliminary operation for disconnecting the connection between the power supply and the controller.

(8): In the aspect of (1) described above, the vehicle control device further includes a storage configured to store information, and the update controller may cause the storage to store information on an interrupted situation when the update of the software is interrupted, and resume the update from a block after a block in which the update is completed at the time of interruption on the basis of the information on the interrupted situation stored in the storage when the update of the software is resumed.

(9): In the aspect of (8) described above, the update controller may determine whether the software is tampered or not before the update of the software is resumed, and resume the update of the software when it is determined that the software is tampered.

(10): A vehicle control method according to another aspect of the present invention includes, by a computer, communicating with an external device, updating software embedded in a controller that controls one or more devices mounted in a vehicle, and interrupting an update of the software when it is predicted that a connection between the controller and a power supply that supplies power to the controller is to be disconnected during the update of the software.

(11): A storage medium according to still another aspect of the present invention is a computer-readable non-transitory storage medium that stores a program which causes a computer to communicate with an external device, update software embedded in a controller that controls one or more devices mounted in a vehicle, and interrupt an update of the software when it is predicted that a connection between the controller and a power supply that supplies power to the controller is to be disconnected during the update of the software.

According to the aspects of (1) to (11) described above, it is possible to execute an update of software more appropriately.

BRIEF DESCRIPTION OF THE DRAWINGS

FIG. 5 is a diagram which shows an example of content of interruption information.

DESCRIPTION OF EMBODIMENTS

Hereinafter, embodiments of a vehicle control device, a vehicle control method, and a storage medium will be described with reference to the drawings.

[Overall Configuration]

Figure 1:
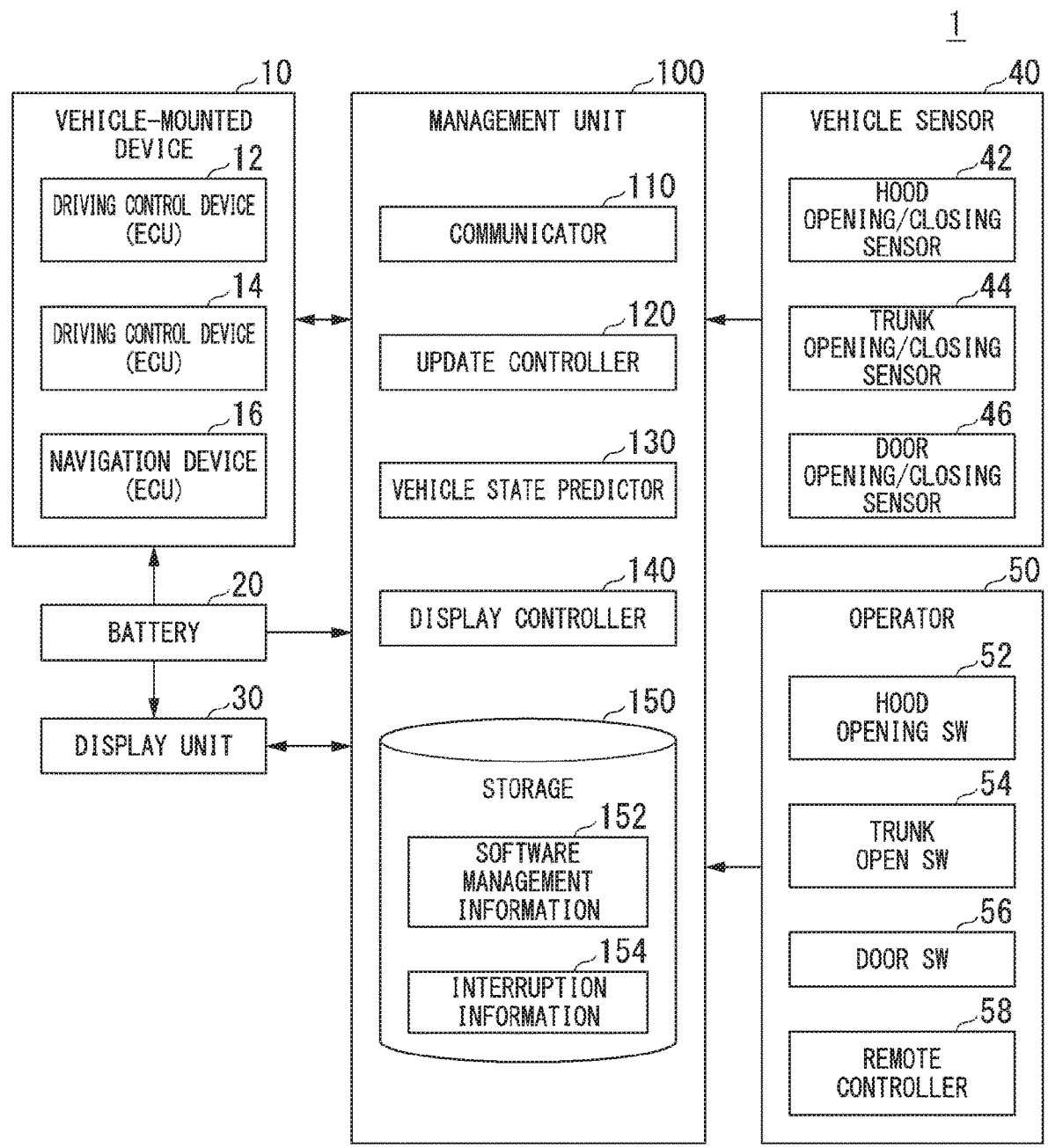
FIG. 1 is a configuration diagram of a vehicle control device of an embodiment.

FIG. 1 is a configuration diagram of a vehicle control device 1 of an embodiment. A vehicle (hereinafter referred to as a vehicle M) in which the vehicle control device 1 is mounted is, for example, a two-wheeled vehicle or a three-wheeled or four-wheeled vehicle, and a drive source thereof is an internal combustion engine such as a diesel engine or a gasoline engine, an electric motor, or a combination of these. The electric motor operates using power generated by a generator connected to the internal combustion engine or discharge power of a secondary battery or a fuel cell.

In FIG. 1, the vehicle control device 1 includes, for example, a vehicle-mounted device 10, a battery (storage battery) 20, a display unit 30, a vehicle sensor 40, an operator 50, and a management unit 100. The battery 20 is an example of a "power supply."

The vehicle-mounted device 10 includes, for example, a driving control device 12, a drive control device 14, and a navigation device 16. The driving control device 12 performs, for example, automatic driving (autonomous driving) control on the vehicle M. The automatic driving control is, for example, controlling one or both of steering and speed of the vehicle M without depending on a driving operation of an occupant of the vehicle M. The automatic driving control has a function of driving control that supports the driving operation of an occupant, such as an adaptive cruise control system (ACC), a lane keeping assistance system (LKAS), or a collision mitigation brake system (CMBS).

The drive control device 14 is a device for causing the vehicle M to travel by applying a drive force or the like to the vehicle M. The drive control device 14 includes, for example, a traveling drive force output device that outputs a traveling drive force (torque) for causing the vehicle M to travel to a drive wheel, a brake device that outputs a brake torque in accordance with a predetermined braking operation to each wheel, and a steering device that changes a direction of a steering wheel.

The navigation device 16 specifies, for example, a position of the vehicle M on the basis of a signal received from a global navigation satellite system (GNSS) satellite. The navigation device 16 determines a route (hereinafter referred to as a route on a map) from the specified position of the vehicle M (or any input position) to a destination input by the occupant using the operator 50 or the like with reference to map information (not shown) stored in the storage 150. The map information is, for example, information in which a road shape is expressed by a link indicating a road and nodes connected by the link. The map information may include a road curvature, point of interest (POI) information, and the like. The map information may include, for example, information on a center of a lane, information on a boundary of the lane, or information on a type of the lane. The map information may include road information, traffic regulation information, address information (an address and a postal code), facility information, telephone number information, and the like. The map information may be updated at any time by the communicator 110 communicating with other devices. The navigation device 16 may perform route guidance by using a map image display on the display unit 30 or by a voice output from a speaker (not shown) on the basis of a route on a map.

Here, each of the driving control device 12, the drive control device 14, and the navigation device 16 of the vehicle-mounted device 10 is configured centering around an electronic control unit (ECU). The ECU is an example of a "controller." The ECU is, for example, configured of a processor, a memory, an auxiliary storage device, an external communication interface, and the like connected by a bus. The ECU has software embedded therein, and control of at least a part of a corresponding device is executed by executing the software. The software contains at least one program module. The program module includes, for example, one or more programs and executes some functions among functions that can be realized by the software. The software can be updated in units of modules by an update controller 120. In the following description, a series of processing for updating the software is referred to as "reprogramming." When the ECU of each device is not distinguished, it will be simply described as an "ECU."

The battery 20 supplies power to, for example, the vehicle-mounted device 10, the display unit 30, the management unit 100, and other electric devices in the vehicle M. A power source used at the time of executing reprogramming is mainly supplied from the battery 20 to the ECU to be updated.

The display unit 30 is a display device such as a liquid crystal display (LCD) or an organic electro luminescence (EL) display. The display unit 30 displays, for example, an image generated by the display controller 140. The display unit 30 may have, for example, a function of receiving operation content from the occupant as a touch panel device. The display unit 30 is configured integrally with the navigation device 16, and may perform a display such as route guidance to a destination using the navigation device 16.

The vehicle sensor 40 includes, for example, a hood opening/closing sensor 42, a trunk opening/closing sensor 44, and a door opening/closing sensor 46. The hood opening/closing sensor 42 detects an opening or closing operation of a hood (an example of a lid portion) that partitions a part of a motor room (a front space) in the front of a vehicle body across a partition member (for example, a dashboard, a cowl member, or the like). The hood opening/closing sensor 42 detects, for example, that the hood is open when the vehicle body and the hood are unlocked, and detects that the hood is closed when they are locked. The hood opening/closing sensor 42 may detect that the hood is in an open state when a rotation angle of a shaft due to a rotation operation from the state in which the hood is closed is equal to or greater than a predetermined angle, and may detect that the hood is in a closed state when it is less than the predetermined angle.

The trunk opening/closing sensor 44 detects an opening/closing operation of a trunk that partitions a part of a trunk room (a rear space) at the rear of the vehicle body across the partition member. The trunk opening/closing sensor 44 detects that the trunk lid is in the open state when the vehicle body and the trunk lid (an example of the lid portion) are unlocked, and detects that the trunk lid is in the closed state when they are locked. The trunk opening/closing sensor 44 may detect that the trunk lid is in the open state when the rotation angle of a shaft due to a rotation operation from the state in which the trunk lid is closed is equal to or greater than a predetermined angle, and detect that the trunk lid is in the closed state when it is less than the predetermined angle.

The door opening/closing sensor 46 detects an opening/closing of a door (an example of the lid portion) that partitions a part of a space in the vehicle interior of the vehicle M. The door opening/closing sensor 46 detects that the door is in the open state when the door lock is unlocked, and detects that the door is in the closed state when the door lock is locked. The door opening/closing sensor 46 may detect that the door is in the open state when the rotation angle of a shaft due to a rotation operation from the state in which the door is closed is equal to or greater than a predetermined angle, and detect that the door is in the closed state when it is less than the predetermined angle.

The vehicle sensor 40 may include, for example, a vehicle speed sensor that detects a speed of the vehicle M, an acceleration sensor that detects acceleration thereof, a yaw rate sensor that detects an angular speed around a vertical shaft, an orientation sensor that detects a direction of the vehicle M, and the like.

The operator 50 receives, for example, an operation from the occupant of the vehicle M. The operator 50 includes, for example, a hood opening switch (hereinafter, a "switch" is referred to as "SW") 52, a trunk opening SW 54, a door opening SW 56, and a remote controller 58. The hood opening SW 52 is a switch for opening a hood. The hood opening SW 52 is provided, for example, near a hood in the front of a vehicle body, near a driver's seat in a vehicle interior, or in the remote controller 58.

The trunk opening SW 54 is a switch for opening a trunk lid. The trunk opening SW 54 is provided, for example, near a trunk at the rear of the vehicle body, near the driver's seat, or in the remote controller 58.

The door opening SW 56 is a switch for unlocking or locking a door lock that is opened or closed when the occupant gets in or out of the vehicle M. The door opening SW 56 is provided, for example, near the driver's seat in the vehicle interior.

The remote controller 58 performs wireless communication with the communicator 110 of the vehicle M, and transmits a control signal corresponding to each SW operation provided in the remote controller 58 to the vehicle M. As a result, control to open the hood or the trunk lid and unlocking or locking of the door lock are executed. The operator 50 may include various display devices, a speaker, a buzzer, a touch panel, a switch, a key, and the like.

The management unit 100 includes, for example, the communicator 110, the update controller 120, a vehicle state predictor 130, a display controller 140, and a storage 150. These components are realized by, for example, a hardware processor such as a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may also be realized by software and hardware in cooperation. The program may be stored in the storage 150 in advance, or stored in a detachable storage medium such as a DVD or a CD-ROM and installed in the storage 150 by the storage medium being attached to a drive device.

The communicator 110 uses, for example, a cellular network, a Wi-Fi network, a Bluetooth (registered trademark), dedicated short range communication (DSRC), and the like, and communicates with various server devices or portable terminal devices, or communicates with other vehicles in the vicinity of the vehicle M. The various server devices includes, for example, server devices that provide software embedded in the ECU.

The update controller 120 performs reprogramming control for updating software embedded in each ECU. The reprogramming control includes, for example, changing (rewriting), adding, deleting, and the like of software. The update controller 120 controls execution, interruption, resumption, and the like of reprogramming of software on the basis of a result of predicting a vehicle state obtained by the vehicle state predictor 130. Details of functions of the update controller 120 will be described below.

The vehicle state predictor 130 predicts a state of the vehicle M. Specifically, the vehicle state predictor 130 predicts whether the vehicle M will be in a state in which the update of software cannot be executed by the update controller 120 in the near future. The state in which the update of software cannot be executed is, for example, a state in which a connection between the battery 20 and the ECU is in the disconnected state. The vehicle state predictor 130 predicts that the connection between the battery 20 and the ECU is in the disconnected state (in other words, the battery 20 and the ECU is to be disconnected), for example, when the operator 50 receives a preliminary operation for disconnecting the connection between the battery 20 and the ECU.

The vehicle state predictor 130 may predict whether an occupant is present in the vehicle interior. In this case, the vehicle state predictor 130 may determine whether the occupant is present in the vehicle interior based on an image captured by a camera (not shown) that captures the vehicle interior, and may determine whether the occupant is present on the basis of a result of detection performed by a load sensor (not shown) provided in a seat in the vehicle interior.

The display controller 140 controls the display unit 30, and generates an image containing information on the update of software of the ECU and information on driving control or driving support. The generated image may include a graphical user interface (GUI) such as an icon. The display controller 140 causes the display unit 30 to display the generated image, a route image obtained by the navigation device 16, and the like.

The storage 150 is realized by, for example, a hard disk drive (HDD), a flash memory, an electrically erasable programmable read only memory (EEPROM), a read only memory (ROM), a random access memory (RAM), or the like. The storage 150 stores, for example, software management information 152, interruption information 154, a program read and executed by a processor, map information, various other types of information, and the like. Content of the software management information 152 and the interruption information 154 will be described below.

[Update Controller]

Figures 2, 3:
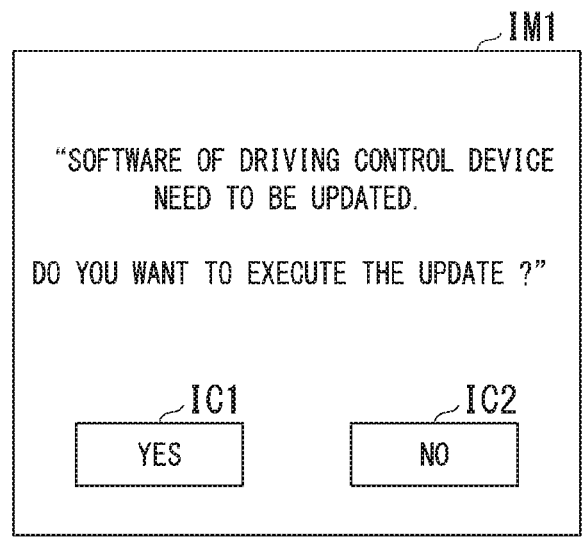
FIG. 2 is a diagram which shows an example of content of software management information.
FIG. 3 is a diagram for describing an inquiry image displayed on a display unit.

Next, details of functions of the update controller 120 will be described. The update controller 120, for example, communicates with an external device (hereinafter described as a server device) using wireless communication such as over the air (OTA), and performs reprogramming of software embedded in an ECU of a target device. Specifically, first, as update preparation processing, the update controller 120 acquires version information of software embedded in the ECU of each device of the vehicle-mounted device 10 from the software management information 152 stored in the storage 150. FIG. 2 is a diagram which shows an example of content of the software management information 152. In the software management information 152, a latest update date and time and version information are associated with ECU identification information. The ECU identification information is identification information for identifying the ECU of each device of the vehicle-mounted device 10. The latest update date and time is a latest update date and time of reprogrammed software. The version information is information regarding a version of software downloaded from a server device and embedded in the ECU.

The update controller 120 communicates with the server device via the communicator 110 at a predetermining timing, and inquires about the version information of each piece of software to determine whether the update of software is necessary. Then, the update controller 120 compares the version information acquired from the server device and the version information acquired from the software management information 152, and updates target software when they do not match (when a version of the server device is newer).

Figure 4:
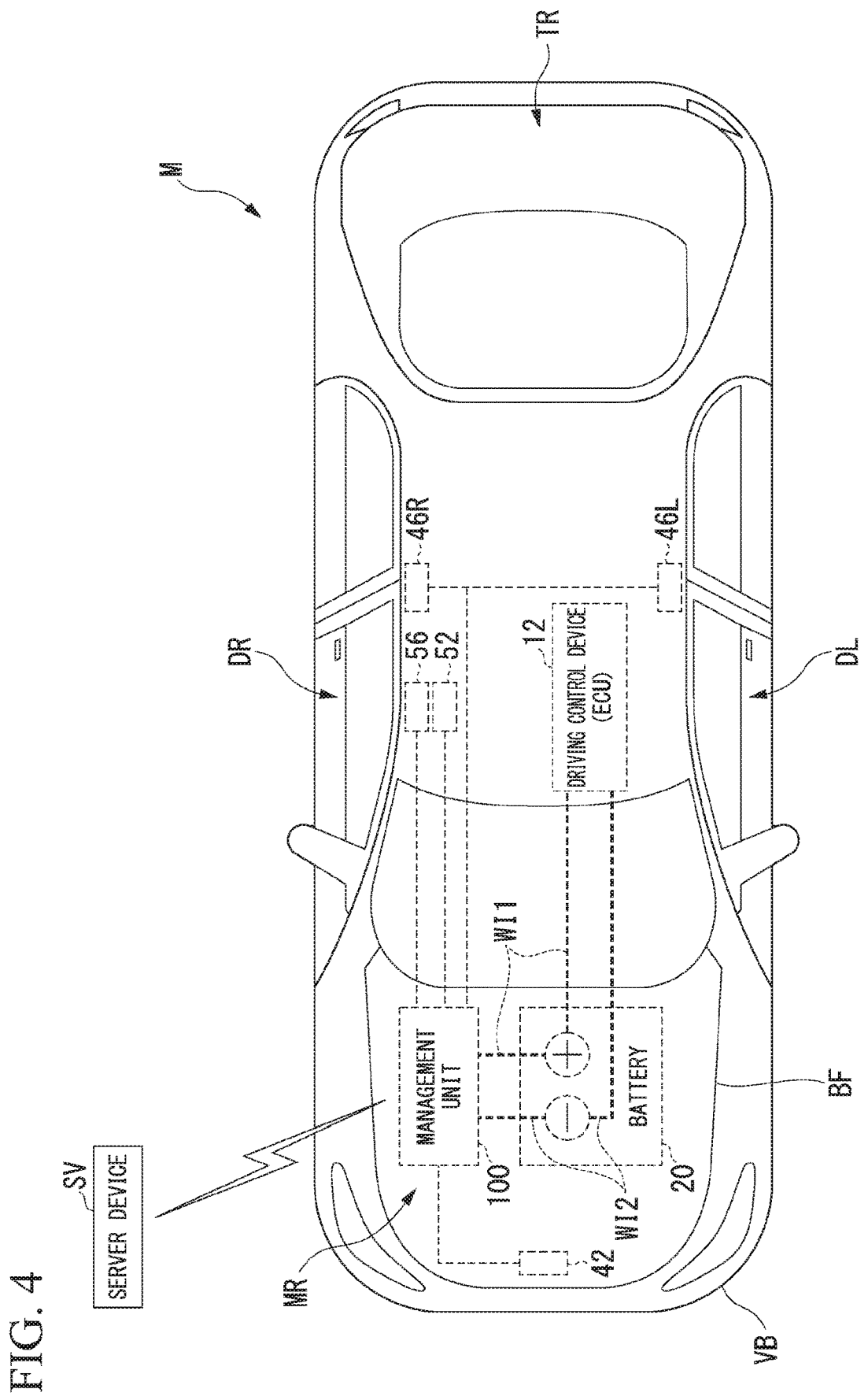
FIG. 4 is a diagram for describing a mounting position of a device that includes a battery and a driving control device.

The update controller 120 causes the display controller 140 to generate an image for inquiring of the occupant about whether to execute the update of software and causes the display unit 30 to display the generated image before the update of software is started. FIG. 3 is a diagram for describing an inquiry image IM1 displayed on the display unit 30. The display controller 140 generates the inquiry image IM1 including inquiry information for inquiring about whether the update is executed or not and icons IC1 and IC2 for selecting permission (YES) or rejection (NO) of the execution of the update. In the example of FIG. 4, as the inquiry information, text indicating "Software of the driving control device needs to be updated. Do you want to execute the update?" is displayed. The inquiry information may also include an estimated time from a start of the update to the completion thereof.

The update controller 120 does not perform the update of software when the display unit 30 receives a selection rejecting the execution of the update (a selection of the icon IC2). The update controller 120 performs the update of software when the display unit 30 receives a selection permitting the execution of the update (a selection of the icon IC1), and predetermined conditions are satisfied. The predetermined conditions are, for example, a device in a drive system of the vehicle M being in a stopped state (for example, ignition being in an off state), the occupant not being in the vehicle interior, a charge amount of the battery 20 being equal to or greater than a predetermined amount, and the like. The update controller 120 executes the processing described above as update preparation processing.

Next, update processing after the update preparation is completed will be described. The update controller 120 requests a new version of software from the server device, and downloads software corresponding to the request when the update of software is performed. At this time, the update controller 120 divides all program modules contained in software to be updated into a plurality of blocks containing one or more program modules, performs a download request for each divided block, and downloads a target block. The blocks may be obtained, for example, by division for every predetermined number of program modules or by division performed such that data capacity is equal to or less than a threshold value. The update controller 120 writes the downloaded block in a memory in the ECU. At this time, it writes a new downloaded program module in another area of the memory while a current version of software is left in the memory in the ECU of a target device. Then, the update controller 120 makes a download request for a next block to the server device, and repeats the same processing as described above until a download of all the blocks is completed.

Here, the update controller 120 interrupts the update processing of software while the download is executed when the vehicle state predictor 130 predicts that the connection between the battery 20 and the ECU is in the disconnected state during the download of software. Specifically, the vehicle state predictor 130 detects an open or closed state of a space in the vehicle in which the battery 20 or the ECU is provided. In the following description, the ECU to be updated is described as the ECU of the driving control device 12, but the same control may also be executed for each ECU for the ECU of another device.

FIG. 4 is a diagram for describing a mounting position of a device that includes the battery 20 and the driving control device 12. In the example of FIG. 4, it is assumed that the battery 20 and the management unit 100 are installed in a motor room MR in the front of the vehicle body VB in the vehicle M. It is assumed that the driving control device 12 is installed in the vehicle interior. The driving control device 12 may be provided in the motor room MR, or may be provided in a trunk room TR at the rear of the vehicle body VB.

In the example of FIG. 4, the driving control device 12 and the management unit 100 are electrically connected to a positive terminal (+) and a negative terminal (−) of the battery 20 via wirings WI1 and WI2, respectively. In the example of FIG. 4, it is assumed that the hood opening/closing sensor 42 is provided in the motor room MR, and the door opening/closing sensors 46L and 46R that detect opening or closing of left and right doors DL and DR of the vehicle M are provided. In the example of FIG. 4, it is assumed that a hood opening SW 52 and a door SW 56 are provided in the vicinity of a driver's seat.

The vehicle state predictor 130 determines whether a lid portion that partitions a space in which the battery 20 and the driving control device 12 are installed is in the open state. The vehicle state predictor 130 may determine whether a lid portion that partitions a space in which the wirings WI1 and WI2 for connecting the battery 20 and the driving control device 12 are present is in the open state. In the example of FIG. 4, the vehicle state predictor 130 determines whether a hood BF that partitions the motor room MR in which the battery 20 is installed, or the doors DR and DL that partition a space of the vehicle interior in which the driving control device 12 is installed are in the open state. For example, when it is determined that the hood BF is in the open state by the hood opening/closing sensor 42, or it is determined that at least one of the doors DR and DL is in the open state by the door opening/closing sensors 46R and 46L, the vehicle state predictor 130 predicts that the battery 20 and the driving control device 12 will be in the disconnected state in the near future.

The vehicle state predictor 130 may predict that the battery 20 and the driving control device 12 will be in a disconnected state in the near future when a preliminary operation for disconnecting the connection between the battery 20 and the driving control device 12 is received instead of (or in addition to) the determination of the open state. The preliminary operation is, for example, an opening operation of the hood BF by the hood opening SW 52 or an unlocking operation of the lock of the door DR or DL by the door opening SW 56. It is possible to more reliably predict that they will be in a disconnected state by predicting a disconnected state on the basis of the preliminary operation.

The update controller 120 interrupts the update based on the divided blocks when the update of software is interrupted. For example, the update controller 120 discards a block in the middle of the update and interrupts a download of subsequent blocks at a time when the vehicle state predictor 130 predicts that the battery 20 and the driving control device 12 will be in a disconnected state in the near future. As a result, it is possible to perform interruption more quickly.

Since the battery 20 and the driving control device 12 are not in a disconnected state yet at the time when the vehicle state predictor 130 predicts that the battery 20 and the driving control device 12 will be in a disconnected state in the near future, the update controller 120 completes a download of a block being downloaded and interrupts a download of subsequent blocks. As a result, when the download is resumed, the same block is not downloaded again, and thus the update can be completed quickly. When a reserve power source such as a capacitor is provided in the vehicle M, the update controller 120 may switch a power source supply destination from the battery 20 to the reserve power source and complete the download of a block being downloaded at the time when it is predicted that the battery 20 and the driving control device 12 will be in a disconnected state in the near future.

On the basis of a remaining data capacity of a block being downloaded and a remaining time until the download of the block is completed at the time when the vehicle state predictor 130 predicts that the battery 20 and the driving control device 12 will be in a disconnected state in the near future, the update controller 120 may switch between discarding the block and completing the download. In this case, the update controller 120 discards the block being downloaded when the remaining data capacity is equal to or greater than a predetermined amount, or when the remaining time is equal to or greater than a predetermined time, and otherwise, completes the download of the block being downloaded.

The update controller 120 causes the storage 150 to store information on a situation in which the download is interrupted as interruption information. FIG. 5 is a diagram which shows an example of content of the interruption information 154. In the interruption information, an interruption date and time, version information, module information, and an interruption reason are associated with ECU identification information. The interruption date and time is, for example, information on a date and time when the interruption is executed. The version information is, for example, information on a version of software being updated. The module information is, for example, information for identifying a program module (or a block) corresponding to a version being updated, and is identification information of a program module (or a block) which is completely downloaded. The interruption reason is, for example, information on a reason for which the update of software with respect to an ECU to be updated is interrupted. When the update of software is interrupted, the update controller 120 generates the interruption information 154 including ECU identification information for the interrupted software, an interruption date and time, software being updated, and module information, and causes the storage 150 to store the generated interruption information 154. A person in charge or the like can easily ascertain an interruption situation at the time of maintenance by storing the interruption information 154. When the update is resumed, the download can be executed from a block after the block which is completely downloaded.

Even if the download is interrupted, since the download has been performed in blocks divided by a program module for which some functions can be executed, it is possible to suppress occurrence of a failure in a memory in a controller or a program being updated.

The update controller 120 resumes the download of software when the vehicle state predictor 130 predicts that the driving control device 12 and the battery 20 will be changed to a state in which they are not disconnected in the near future while update processing is interrupted. The update controller 120 may determine whether the software has been tampered with by a third party before the update of the software is resumed. For example, the update controller 120 acquires a latest update date of software embedded in the ECU of the driving control device 12 and version information thereof, compares the acquired latest update date and version information and the latest update date and version information of the software management information 152 stored in the storage 150, determines that tampering has not been performed when they match, and determines that tampering has been performed when they do not match.

When it is determined that tampering has not been performed, the update controller 120 refers to the interruption information 154 stored in the storage 150 and resumes the download from a next module of the interrupted version of software. As a result, it is possible to complete the download of software earlier than the download from the beginning.

When it is determined that tampering has been performed, the update controller 120 downloads a version of software included in the software management information 152 from the server device SV and updates the software again. As a result, software that may have been tampered with can be restored to software in a normal state before update. As a result, it is possible to execute a normal operation for a vehicle-mounted device. When it is determined that tampering has been performed, the update controller 120 may transmit information indicating that the tampering may have been performed to an external device (for example, an administrator terminal) via the communicator 110, and the display controller 140 may cause the display unit 30 to display it. As a result, it is possible to allow an administrator, an occupant, and the like to ascertain that there has been a tampering operation performed on software by a third party and to respond to a manufacturer quickly by disclosing the fact.

When a download of all the blocks has been completed, the update controller 120 performs an operation confirmation for downloaded software. As a result of the operation confirmation, current software is rewritten in the downloaded new version of the software after confirming that the operation has been performed normally. When the update controller cannot confirm that the operation is performed normally, the update controller 120 discards, for example, the downloaded new version of the software and keeps using the current software. The update controller 120 may perform rewriting of the software at a timing at which a device of the drive system of the vehicle M is started (for example, a timing at which ignition is turned on). The rewriting of the software described above may also be performed in units of blocks. As a result, a series of update processing in the present embodiment ends.

[Processing Flow]

Figure 6:
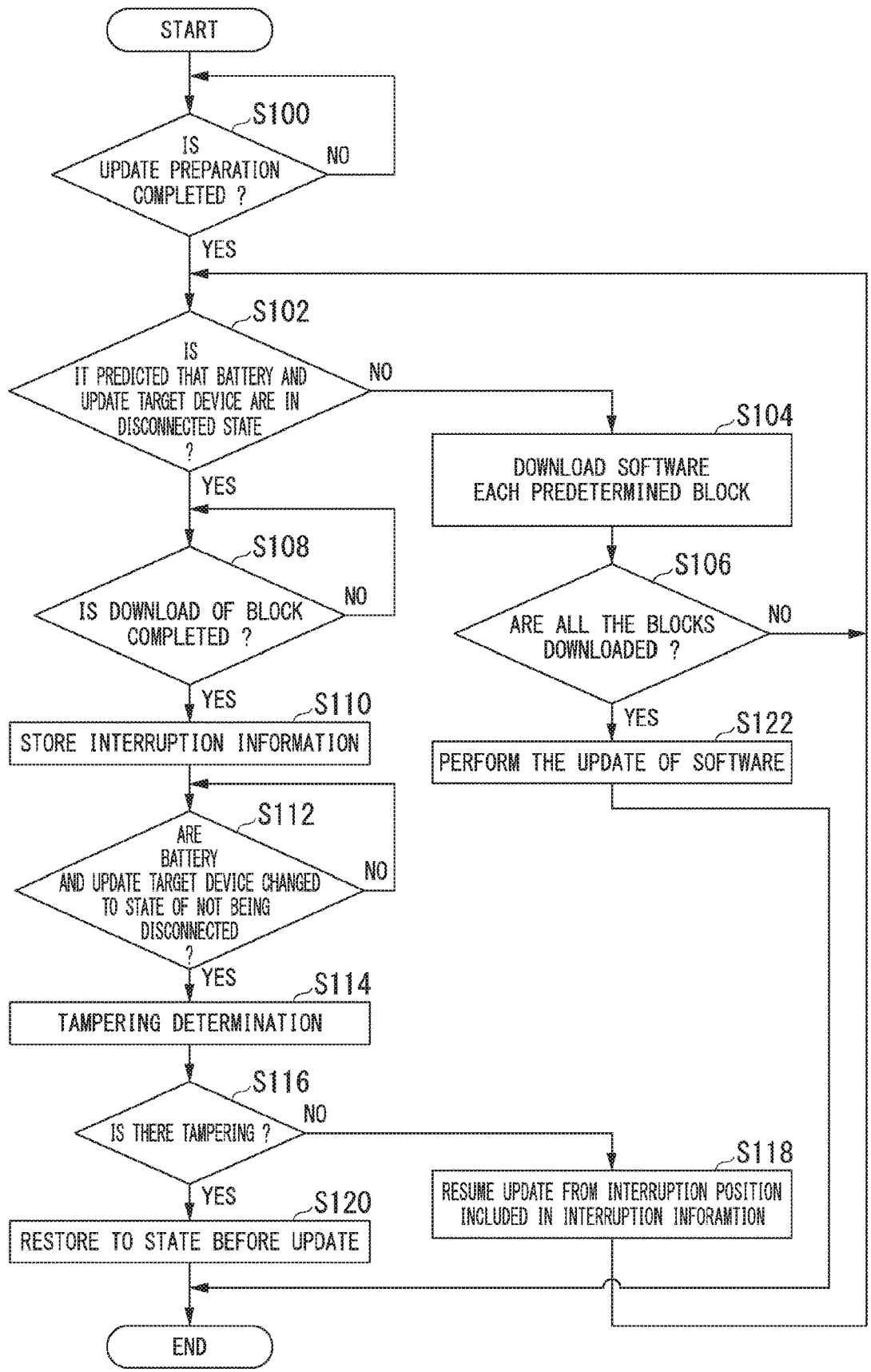
FIG. 6 is a flowchart which shows an example of a flow of processing executed by a management unit of the vehicle control device of the embodiment.

FIG. 6 is a flowchart which shows an example of a flow of processing executed by the management unit 100 of the vehicle control device 1 of the embodiment. The present flowchart processing is, for example, repeatedly executed at a predetermined cycle. In the example of FIG. 6, the update controller 120 determines whether an update preparation of software has been completed (step S100). The update preparation herein is, specifically, to be a state in which latest software can be downloaded from the server device SV, and more specifically, to be a state in which software to be updated is specified and a selection (selection of an icon IC1 shown in FIG. 3) of permission to update the software from the display unit 30 on which the inquiry image IM1 shown in FIG. 3 is displayed.

When the update preparation is not completed, the update controller 120 waits until it is completed. The update controller 120 may end the processing of FIG. 6 without performing subsequent processing when the update preparation is not completed even after a predetermined time has elapsed.

When the update preparation is completed, the vehicle state predictor 130 determines whether it is predicted that the battery 20 and the update target device (ECU) are in a disconnected state (step S102). When it is not predicted that the battery 20 and an update target device are in a disconnected state, the update controller 120 downloads software for each predetermined block obtained by dividing the software to the update target device (step S104). Next, the update controller 120 determines whether all the blocks have been downloaded (step S106). When all the blocks have not been downloaded, the update controller 120 returns to the processing of step S102.

In the processing of step S102, when it is predicted that the update target device and the battery 20 are in a disconnected state, the update controller 120 determines whether the download of a block has been completed (step S108). When it is determined that the download of a block has not been completed, the update controller 120 waits until the download of a block is completed. When it is determined that the download of a block has been completed, the update controller 120 generates interruption information and causes the storage 150 to store the generated interruption information (step S110). Next, the update controller 120 determines whether the update target device and the battery 20 have been changed from a state of being disconnected to a state of not being disconnected (step S112). When they are changed to the state of not being disconnected, the update controller 120 performs tampering determination processing of software of the update target device (step S114), and determines whether the software is tampered or not (step S116).

When it is determined that the software is not tampered, the update controller 120 resumes the update from an interruption position (a next block) on the basis of module information included in the interruption information of the storage 150 (step S118), and returns to the processing of step S102. In the processing of step S116, when it is determined that the software is tampered, the update controller 120 downloads software before the update from the server device again, and restores the software of the update target device to a state before the update (step S120).

In the processing of step S106, when all the blocks included in software for the update have been downloaded, the update controller performs the update of software (step S122), and ends the present flowchart processing. In the processing of step S108 of the flowchart of FIG. 6, the update controller may determine whether a block being downloaded has been discarded.

According to the embodiment described above, it is possible to execute the update of software more appropriately. Specifically, according to the present embodiment, by downloading each block, it is possible to suppress an accidental ECU failure due to power loss and a failure of a program being updated, and to implement reprogramming using wireless communication such as OTA more reliably. According to the present embodiment, when a predetermined vehicle state has been detected, an interruption situation (interruption position) of reprogramming is stored, and thereby it is possible to resume the update from the interruption position when the update processing is resumed. According to the present embodiment, it is possible to suppress a software update by a malicious third party on the vehicle M.

[Hardware Constituent]

Figure 7:
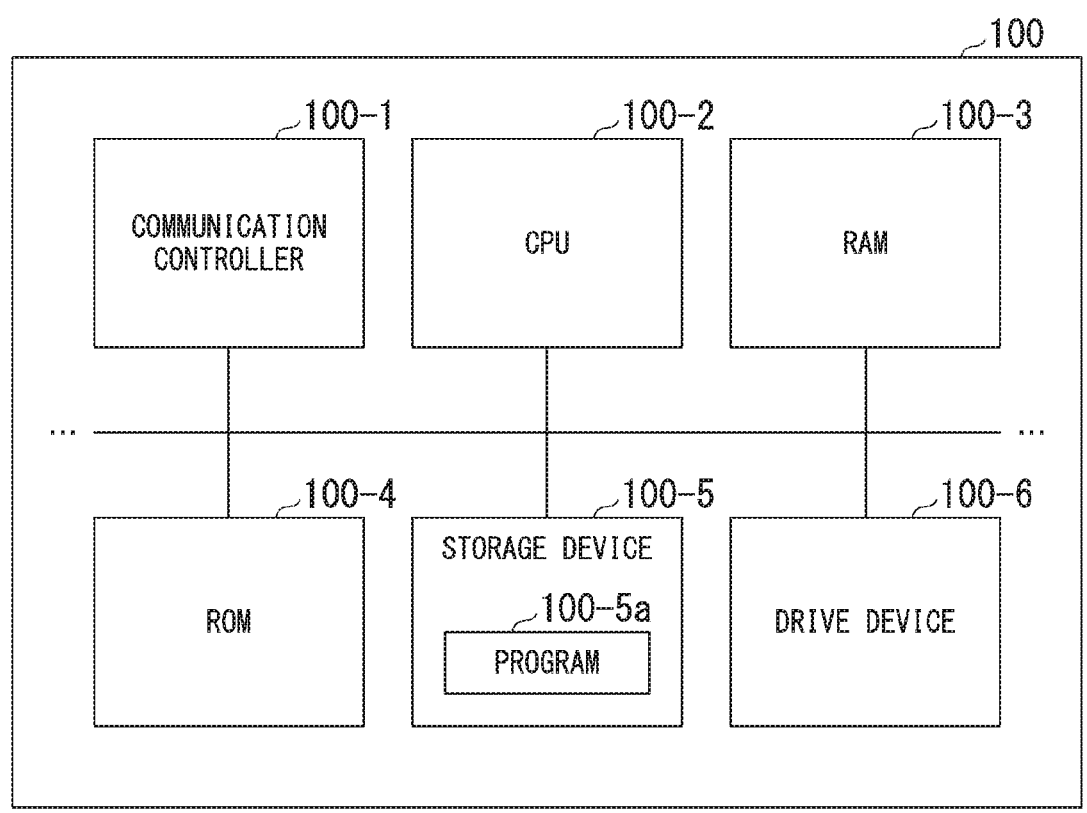
FIG. 7 is a diagram which shows an example of hardware constituents of a management unit of the embodiment.

The management unit 100 of the vehicle control device 1 of the embodiment described above is realized by, for example, constituents of computer hardware shown in FIG. 7. FIG. 7 is a diagram which shows an example of hardware constituents of the management unit 100 of the embodiment.

The management unit 100 shown in FIG. 7 is configured from a communication controller 100-1, a CPU 100-2, a RAM 100-3, a ROMN 100-4, a storage device 100-5 such as a flash memory or an HDD, and a drive device 100-6 being connected by an internal bus or a dedicated communication line. A portable storage medium such as an optical disc is attached to the drive device 100-6. A program 100-5*a* stored in the storage device 100-5 is expanded in the RAM 100-3 by a DMA controller (not shown) and the like, and executed by the CPU 100-2, and thereby functional units of the management unit 100 are realized. A program referred to by the CPU 100-2 may be stored in the portable storage medium attached to the drive device 100-6, and may also be downloaded from another device via a network NW.

The embodiment described above can be expressed as follows.

A vehicle control device includes a storage device and a hardware processor that executes a program stored in the storage device, and, by the hardware processor executing the program, to communicate with an external device, to update software embedded in a controller that controls at least some of devices mounted in a vehicle, to interrupt the update of the software when it is predicted that a connection between the controller and a power supply that supplies power to the controller is in a disconnected state during the update of the software.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising: a controller including a processor and a memory coupled to the processor, the memory storing software that is executable by the processor, the software, when executed by the processor, causing the controller to execute processes that control one or more devices mounted in a vehicle, the processes including: communicating with an external device, updating the software according to a communication with the external device, and predicting a state of the vehicle, and receiving an operation from an occupant of the vehicle; and a power supply configured to supply power to the controller, wherein the controller predicts that a connection between the power supply and the controller is to be disconnected in the near future when the controller receives a preliminary operation for physically disconnecting the connection between the power supply and the controller, the controller interrupts an update of the software when the controller predicts that the connection between the power supply and the controller is to be disconnected in the near future during the update of the software, and the preliminary operation includes an operation for opening: a first lid portion partitioning a first space in which the power supply or the controller is installed; or a second lid portion partitioning a second space in which a wiring connecting the power supply and the controller is present.

2. The vehicle control device according to claim 1,
wherein the software contains one or more program modules, and
the controller divides the software to be updated into a plurality of blocks containing one or more program modules, resulting in divided blocks, and interrupts the update based on the divided blocks when the update of the software is interrupted.

3. The vehicle control device according to claim 2,
wherein the controller discards information on a block being downloaded from the external device when the update of the software is interrupted.

4. The vehicle control device according to claim 2,
wherein the controller interrupts the update of the software after a download of the block being downloaded from the external device is completed when the update of the software is interrupted.

5. The vehicle control device according to claim 1,
wherein the controller causes the memory to store information on an interrupted situation when the update of the software is interrupted, and resumes the update from a block after a block in which the update is completed at the time of interruption on the basis of the information on the interrupted situation stored in the memory when the update of the software is resumed.

6. The vehicle control device according to claim 5,
wherein the controller determines whether or not the software is tampered with before the update of the software is resumed, and resumes the update of the software when it is determined that the software is not tampered with.

7. A vehicle control method comprising: by a computer, communicating with an external device; updating software embedded in a controller that controls one or more devices mounted in a vehicle; predicting that a connection between a power supply configured to supply power to the controller and the controller is to be disconnected in the near future when an operator configured to receive an operation from an occupant of the vehicle receives a preliminary operation for physically disconnecting the connection between the power supply and the controller; and interrupting an update of the software when it is predicted that the connection between the controller and the power supply is to be disconnected in the near future during the update of the software, wherein the preliminary operation includes an operation for opening a first lid portion partitioning a first space in which the power supply or the controller is installed or a second lid portion partitioning a second space in which a wiring connecting the power supply and the controller is present.

8. A computer-readable non-transitory storage medium that stores a program which causes a computer to communicate with an external device, update software embedded in a controller that controls one or more devices mounted in a vehicle, predict that a connection between a power supply configured to supply power to the controller and the controller is to be disconnected in the near future when an operator configured to receive an operation from an occupant of the vehicle receives a preliminary operation for physically disconnecting the connection between the power supply and the controller; and interrupt an update of the software when it is predicted that the connection between the controller and the power supply is to be disconnected in the near future during the update of the software, wherein the preliminary operation includes an operation for opening a first lid portion partitioning a first space in which the power supply or the controller is installed or a second lid portion partitioning a second space in which a wiring connecting the power supply and the controller is present.

\* \* \* \* \*